United States Patent [19]

Plester et al.

[11] Patent Number: 5,058,780
[45] Date of Patent: Oct. 22, 1991

[54] DOSING SYSTEM FOR AN UNVENTED CONTAINER

[75] Inventors: George Plester, Essen, Fed. Rep. of Germany; Frederick D. Schorr, Decatur, Ga.; Georg Troska, Herten, Fed. Rep. of Germany

[73] Assignee: The Coca-Cola Company, Atlanta, Ga.

[21] Appl. No.: 410,882

[22] Filed: Sep. 22, 1989

[51] Int. Cl.⁵ ............................................. G01F 11/00
[52] U.S. Cl. ..................................... 222/321; 222/333
[58] Field of Search ............... 222/528, 529, 587, 538, 222/453, 530, 321, 333, 379, 384, 409, 1, 504; 92/110; 417/497, 469, 486, 487

[56] References Cited

U.S. PATENT DOCUMENTS

| | | | |
|---|---|---|---|
| 1,988,865 | 1/1935 | Campbell | 221/115 |
| 2,314,384 | 3/1943 | Berwick et al. | 221/112 |
| 2,695,736 | 11/1954 | Punte | 222/538 |
| 2,807,393 | 9/1957 | Metrailer et al. | 222/453 |
| 2,847,145 | 8/1958 | Biasile et al. | 222/504 |
| 2,895,654 | 7/1959 | Rieke | 222/529 |
| 3,042,271 | 7/1962 | Winstead | 222/529 |
| 3,342,384 | 9/1967 | Jacobs | 222/481 |
| 4,474,307 | 10/1984 | Chappell | 222/321 X |
| 4,505,312 | 3/1985 | Lardner et al. | 222/528 |
| 4,693,400 | 9/1987 | Frahm et al. | 222/529 |
| 4,795,063 | 1/1989 | Sekiguchi et al. | 222/321 X |
| 4,893,734 | 1/1990 | Chlystun | 222/529 |
| 4,941,598 | 7/1990 | Lambelet, Jr. et al. | 222/321 |

FOREIGN PATENT DOCUMENTS 0010963 5/1980 European Pat. Off. ............ 222/321

Primary Examiner—Michael S. Huppert
Assistant Examiner—Anthoula Pomrening
Attorney, Agent, or Firm—Birch, Stewart, Kolasch & Birch

[57] ABSTRACT

A dosing system has a vessel for holding a fluid and a dosing device for dispensing a measured quantity of fluid from the vessel. The dosing device hermetically seals the vessel and has a valve with a fluid passage, a piston surrounding the valve and a cylinder housing surrounding the piston. The valve is positioned in a first position wherein fluid is gravity fed from the vessel to a chamber formed between a drive face of the piston and the cylinder housing. The valve can be reciprocated from the first position to a second position whereat the valve closes the inlet from the vessel to the chamber. The piston closes the passage within the valve when the valve is in the first position and opens the passage when the valve is moved to the second position to permit discharge of fluid from the chamber. When the valve moves to a third position, the drive face of the piston moves toward a shoulder of the cylinder housing to thereby pump the fluid from the chamber. The valve can be moved between these three positions to repeatedly discharge fluid. When the valve returns from the third through the second to the first position, the drive face of the piston will move away from the shoulder of the cylinder creating suction in the chamber. This suction will assist in the gravity feed of fluid from the vessel to the chamber. The dosing system is particularly useful in a dispenser for a beverage and the vessel can be a bag-in-box container. A pliable funnel portion is provided between the vessel and the dosing device whereby the dosing device may be pushed into or pulled from the vessel.

12 Claims, 5 Drawing Sheets

DOSING SYSTEM FOR AN UNVENTED CONTAINER

BACKGROUND OF THE INVENTION

1. Field of the Invention

The present invention relates to a dosing system for dispensing a measured quantity of fluid, such as a beverage, from a vessel, such as a bag-in-box container. The fluid is gravity fed from the vessel to the dosing means which includes in essence a mechanical dosing pump.

2. Description of the Background Art

Various dosing systems are known in the prior art. However, the majority of these systems rely upon a venting arrangement to discharge liquid from a measuring chamber. This venting arrangement not only exposes the fluid to possible contamination, but also requires the use of additional venting elements and can prove unsatisfactory in handling a sticky, highly viscous fluid. Moreover, uncontrollable dripping is often a problem in these dosing systems.

Other drawbacks to conventional dosing systems include the need for cleaning dosers. This can be particularly troublesome if the system is to be used by non-commercial users who are unlikely to be very fastidious in their cleaning care. With improper cleaning, microbiological spoilage of the liquid may be encountered.

Certain dosing systems known in the prior art will also have air contact with the fluid contained in a storage vessel. With certain products like syrup or flavor concentrate used in a post-mix carbonated beverage, or other liquids having vitamin C, this air contact can damage the fluid.

Various dosing systems known in the art are also rather complicated to use and can be expensive to manufacture. Also, these dosing systems may be inflexible as to the type of vessel used for holding the fluid requiring large or structurally complex containers. Moreover, the prior art doser and vessel combinations are rather bulky incurring problems in handling and storage. Such prior art dosing systems may also require a complicated procedure for refilling the fluid containing vessel when empty.

Accordingly, a need exists in the art for a simple and effective dosing system which is inexpensive to manufacture and requires little maintenance. Further, there is a need in the art for a dosing system which is easy to operate and is compact, thereby reducing overall space requirements. Also, a need exists for a dosing system which will not expose the fluid contained in a storage vessel to air and which will not be subject to contamination of the fluid during dispensing. Moreover, a doser which does not need extensive cleaning procedures and which avoids microbiological spoilage is needed.

SUMMARY OF THE INVENTION

Accordingly, it is a primary object invention to provide a dosing system which is compact and easily operated to quickly and accurately feed a measured quantity of fluid.

It is another object of the present invention to provide a dosing system which is not open to the atmosphere thereby avoiding oxygen contact with fluids. This is especially important with sensitive beverages such as those containing vitamin C.

It is yet another object of the present invention to provide a dosing system which avoids the need to frequently clean the doser or anything within a dispenser in which it is used and which avoids microbiological spoilage.

It is still another object of the present invention to provide a dosing system which is inexpensive to manufacture and can be used with a low cost package.

Another object of the present invention is to provide a dosing system which can be pushed into and pulled from a package thereby making packing, handling and transportation simpler and less expensive.

Still another object of the present invention is to provide a dosing system which can work with a variety of packages. Accordingly, if a preferred package type is unavailable, another can be used.

Yet a further object of the present invention is to provide a dosing system which has an attractive package appearance.

It is another object of the present invention to provide a dosing system which does not require complicated handling, avoids the need to screw or unscrew various components during installation and which can easily be loaded into a dispenser.

It is yet another object of the present invention to provide a dosing system which will not drip when the doser is closed.

Still another object of the present invention is to provide a dosing system with very low fluid wastage.

It is a further object of the present invention to provide a dosing system which is compressible, thereby aiding in solid waste disposal and other environmental considerations.

An additional object of the present invention is to provide a dosing system which may assuredly feed sticky fluids.

Yet another object of the present invention is to provide a dosing system which requires little, if any, maintenance.

These and other objects of the present invention are fulfilled by providing a dosing system comprising a vessel for holding the fluid and dosing means. Fluid is fed from the vessel by gravity to the dosing means. This dosing means comprises a valve with a fluid passage therethrough, a piston surrounding the valve and a cylinder housing surrounding the piston. The valve will be reciprocated to one of at least three positions. In a first position, the piston will close the fluid passage in the valve, but in the second position, the piston will open the fluid passage of the valve. This Piston has a drive face which forms a chamber with the cylinder housing for receiving fluid when the valve is in the first position. When the valve moves to the second position, the inlet to this chamber will be closed and the fluid passage of the valve will be exposed to the fluid in the chamber. The valve can then move to a third position thereby forcing the drive face of the piston proximate the cylinder housing. This motion will pump the fluid from the chamber through the fluid passage in the valve to thereby dispense a measured quantity of fluid.

These and other objects of the present invention are also fulfilled by Providing a method for dispensing a measured dose of fluid comprising the steps of filling a vessel with fluid to be dispensed, providing a doser on the lower side of the vessel and feeding fluid by gravity from the vessel to the doser. The doser includes a valve with the fluid passage therethrough, a piston which surrounds the valve and a cylinder housing which surrounds the piston. The method meters an amount of fluid to be dispensed by moving the valve to a first position permitting fluid to enter a chamber formed between the drive face of the piston and the cylinder housing. Closing the entry to the chamber is then carried out by moving the valve to a second position. Discharge is started by moving the valve towards a third position whereby the fluid from the chamber may be pumped through the fluid passage in the valve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1A:
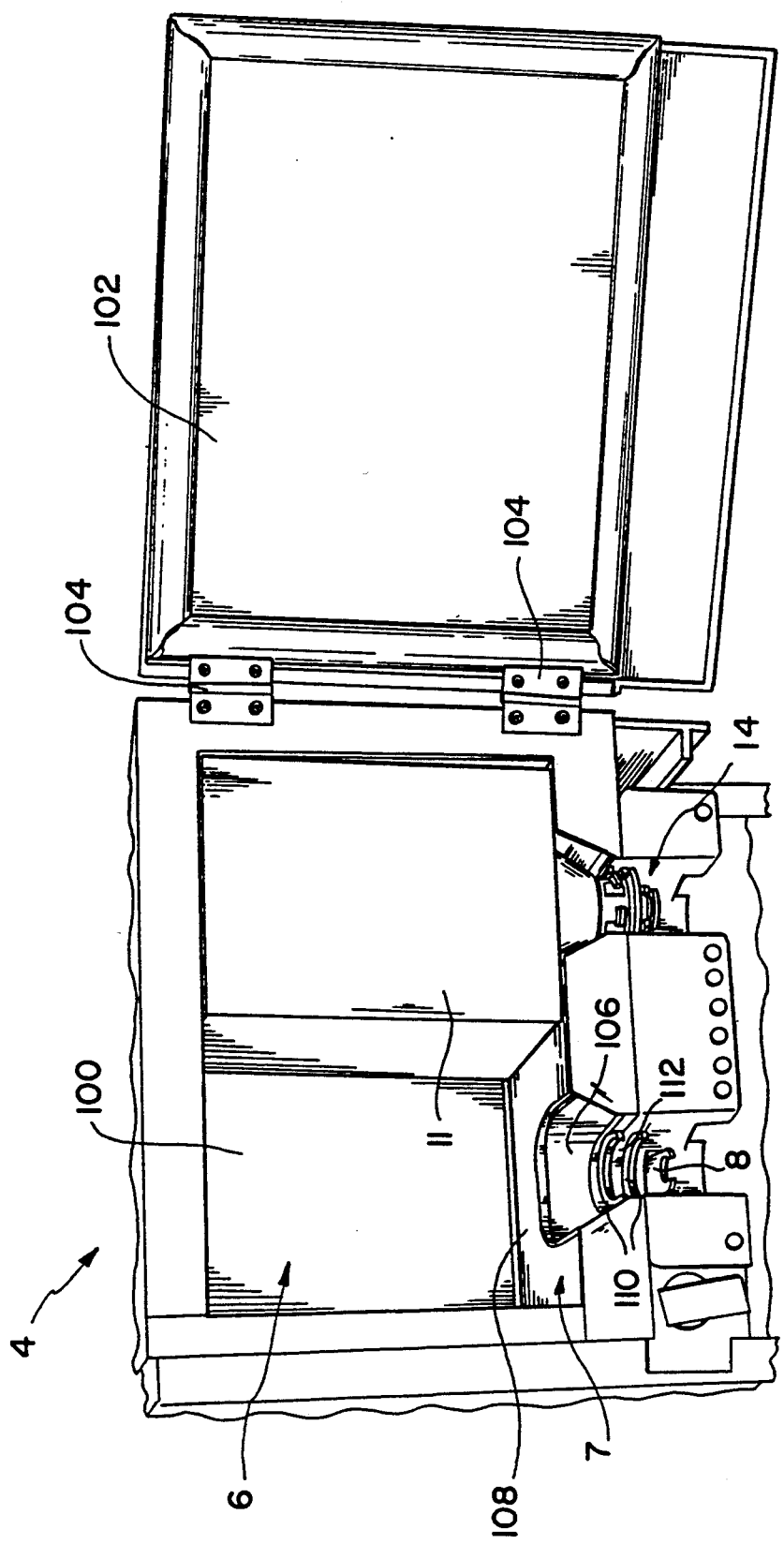
FIG. 1A is a front view of a dispenser having the dosing system of the instant invention.

Referring in detail to the drawings and with particular reference to FIG. 1A, the dosing system 2 of the instant invention is shown. This dosing system 2 is placed within a dispenser 4 through opening 6. Within the dispenser 4, a support 7 is provided for holding the vessel 11. The support has a U-shaped recess 106 therein. A Pivoting fork 8 driven by a drive means 9 extends through this recess 106 to drive dosing means 14 as will be discussed in detail below.

The top 108 of support 7 receives the vessel 11 having the dosing means 14 on its lower side. This vessel 11 is merely slid onto the top 108 of support 7 and the dosing means 14 is received in recess 106. The vessel 11 is placed in cavity 100 of the dispenser 4. A door 102 is pivotably attached to dispenser 4 by hinges 104. This door may be moved to the open position shown in FIG. 1A to permit loading of vessel 11 into cavity 100. Before operating the dispenser 4, the door 102 is swung to the closed position.

It should be understood that FIG. 1A shows two recesses 106 in support 7 whereby two different vessels 11 can be inserted into the dispenser 4. These vessels 11 may contain the same type or different types of fluid. It should further be understood that the dispenser 4 may be designed such that only a single vessel or a more than two vessels can be loaded into cavity 100.

Drive means 9 is provided for driving the dosing means 14. This drive means 9 has a fork which extends into the recess 106 as noted above. Drive means 9 is explained with reference to FIG. 1B. The drive means 9 comprises a synchronous motor 120 having a drive shaft 122. A gear 124 is mounted at the end of drive shaft 122. Intermeshed with gear 124 is a second gear 126. By driving shaft 122, gear 124 and 126 can be rotated. On a side of gear 126, pin 128 is provided. This pin 128 will move with rotation of gear 126 to cause rocking movement of lever 130. This lever 130 is connected to shaft 132 of fork 8. The shaft 132 is mounted on support 134 which is rigidly affixed to the dispenser 4. A pivot 136 is provided in support 134 for allowing pivotable movement of fork 8.

As will be described in detail below, the fork 8 is detachably connected to a valve 60 of dosing means 14. Upon pivotable movement of fork 8, the valve 60 is moved longitudinally. It should be understood that continued operation of motor 120 causes repeated pivoting of fork 8 and movement of valve 60. Because this fork 8 causes reciprocation of valve 60, the fork 8 can be thought of as a reciprocating fork.

Figure 1B:
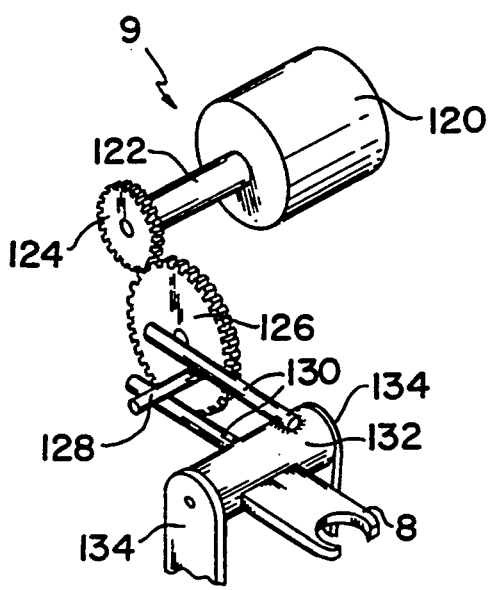
FIG. 1B is a perspective view of a drive arrangement for the dosing system of the instant invention.

While only a single drive means 9 is shown in FIG. 1B, it should be understood that a plurality of drive means can be used in the dispenser 4 if a plurality of vessels are loaded therein. Moreover, other suitable drive means 9 can be used to reciprocate the valve 60.

Figure 2:
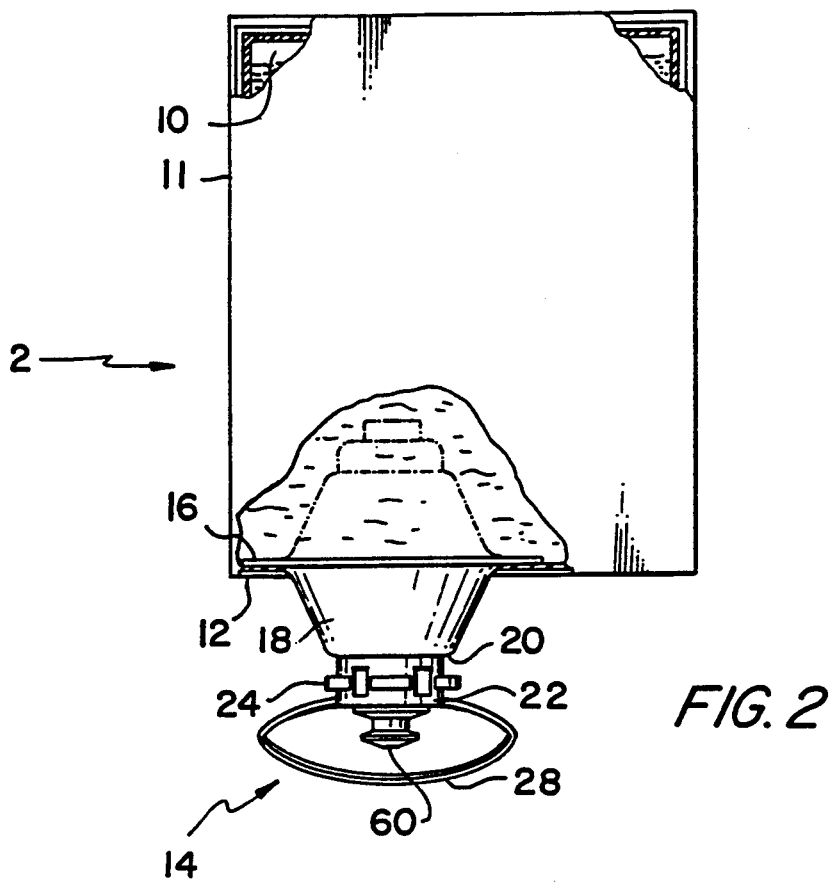
FIG. 2 is a side view with portions partially broken away of the dosing system of the instant invention in combination with a bag-in-box package.

Referring now to FIG. 2, the dosing system 2 of the present invention can be more clearly seen. Dosing system 2 includes a bag-in-box container with bag 10 and box 11. This bag-in-box container or vessel is filled with a fluid to be dispensed. This liquid may be a beverage, syrup (flavor concentrate) for a carbonated beverage, orange juice or any other desired fluid. It should be noted that while a bag-in-box container has been described, any suitable vessel can be used. Thus, if a particular container is unavailable in one country, it is possible to substitute another type of vessel. The bag-in-box container does have ecological benefits in solid waste disposal because it is easily compressed when empty. Also, such containers are relatively low cost.

Beneath the bag-in-box container or vessel 11 is the dosing means 14. A flange 16 is provided at the upper end of the dosing means 14 at opening 12 in the vessel. Extending downwardly from the flange is a pliable funnel portion 18. This funnel portion 18 has a lip portion 20 which rests in recess 106 on the top 108 of support 7 when the dosing system is Placed in the dispenser 4.

Figure 1C:
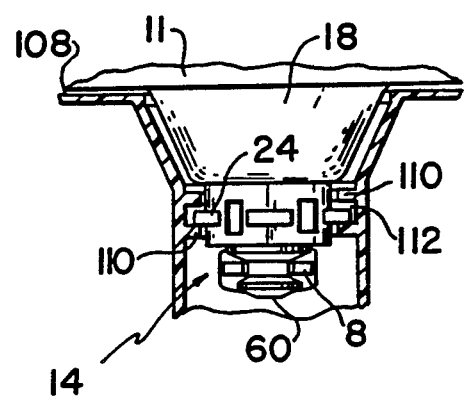
FIG. 1C is a front, cross-sectional view of a portion of the dispenser which receives the doser of the instant invention.

The dosing means 14 also has a cylinder housing 22 with a plurality of spaced apart circumferential ridges 24 as will be discussed below. As best seen in FIGS. 1A and 1C, these ridges 24 are slid into a stationary yoke 110 provided in the recess 106 when the vessel 11 and dosing means 14 are placed in the dispenser 4. The stationary yoke 110 has a recess 112 for receiving the ridges 24. When the ridges 24 are placed in the stationary yoke 110, upward and downward movement of the cylinder housing 22 as well as the funnel portion 18 are prevented. Thus, even when valve 60 or piston 38 of the dosing means moves (as will be described below), the cylinder housing 22 will remain stationary relative to the dispenser 4.

Referring again to FIG. 2, the pliable funnel can be manipulated to push the dosing means 14 inside the vessel 11 as indicated by the dotted lines. In this manner, a generally square container is provided for shipping and handling. The package is therefore simpler and less expensive from a standpoint of secondary packing, handling and transportation due to the provision of this flexible funnel.

Attached to the lower end of dosing means 14 is a ring 28. This ring 28 can be grasped when the dosing means 14 is pushed inside the container in order to pull the dosing means 14 from the dotted to the solid position of FIG. 2. The vessel 11 will be loaded into dispenser 4 when the dosing means 14 is pulled to this solid line position. The ring 28 may be permanently affixed to the lower portion of the dosing means 14 or may be designed to break away after the dosing means 14 is pulled from the vessel 11. If the ring 28 is to remain on the dosing means 14, it can be pushed to an out of the way position whereby it will not interfere with dispensing of measured quantities of fluid.

Figure 3:
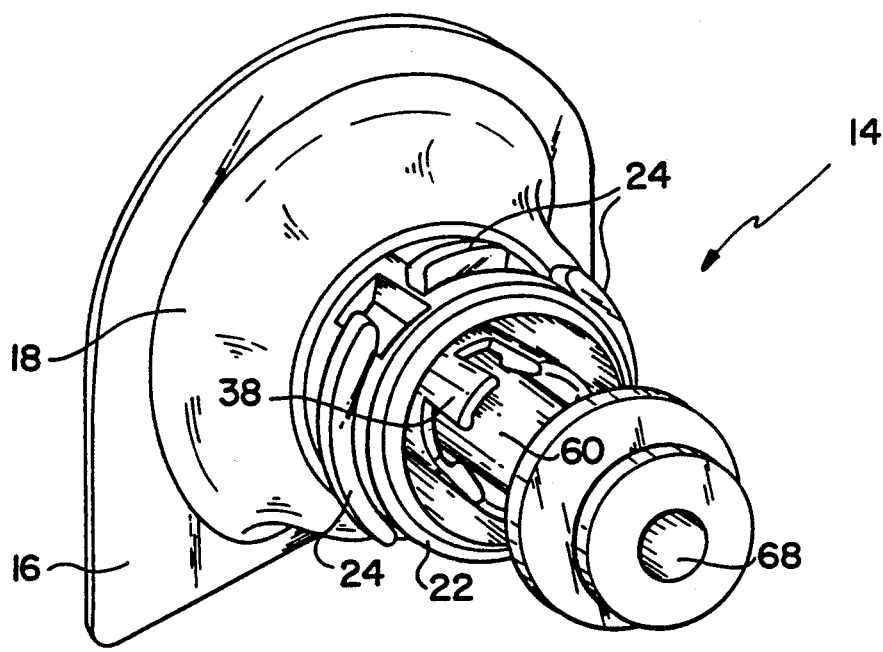
FIG. 3 is a perspective, bottom view of the dosing means of the instant invention with ring 28 removed and with the valve 60 in an extended position.
Figure 4:
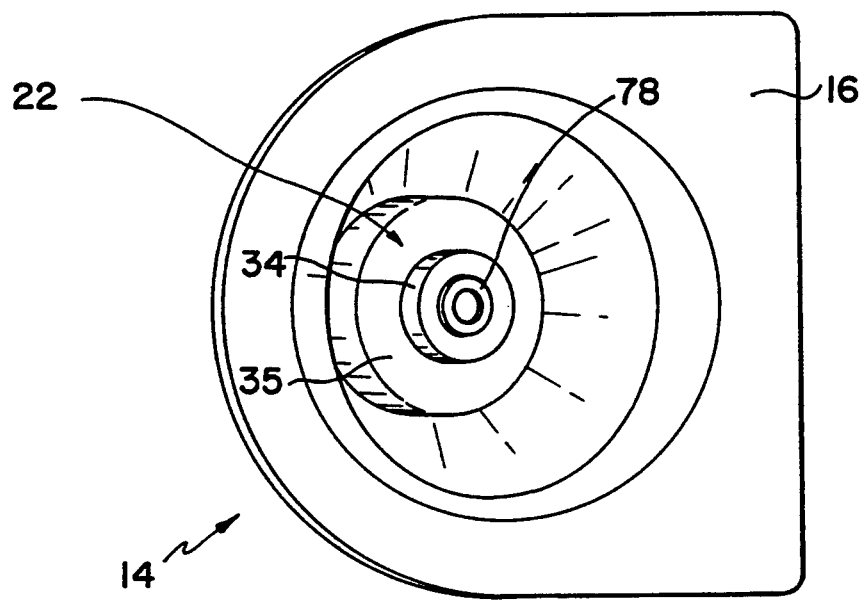
FIG. 4 is a perspective, top view of the dosing means of the instant invention with the valve 60 in a retracted position.

As indicated in FIGS. 2, 3, and 4, the dosing means consists of a cylinder housing 22, a piston 38 and a valve 60. Each of these elements will be discussed in detail below. The cylinder housing 22 is fixed relative to the funnel portion 18 while the piston 38 and valve 60 are both movable along a longitudinal axis A—A extending therethrough. In the FIG. 3 showing, the valve 60 is extended (a first position) while in the FIG. 4 showing, the valve 60 is retracted (a third position). For clarity, the ring 28 is not shown in FIG. 3.

Figure 5:
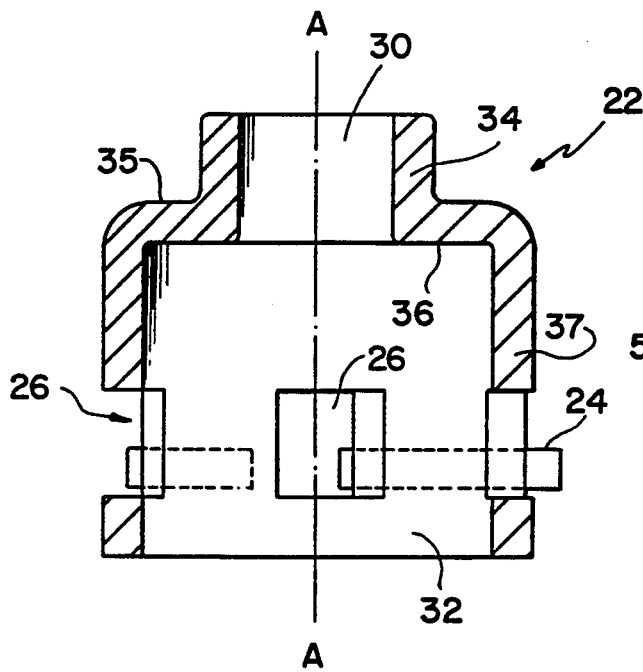
FIG. 5 is a cross-sectional view of the cylinder housing of the instant invention with the ring 28 removed.

Turning now to FIG. 5, the cylinder housing 22 will be discussed in greater detail. The,. ring 28 which may be affixed to cylinder housing 22 is not shown in FIG. 5 for clarity. This cylinder housing 22 has a top inlet 30 which receives liquid from the funnel portion 18 when this opening is not blocked by valve 60. The bottom of the cylinder housing 22 is opened at 32. Fluid will flow by gravity from vessel 11 through the funnel portion 18 and into a portion of the cylinder housing 22 when the valve 60 is in the first position. The inlet 30 is formed by a generally circular neck 34. A shoulder portion 35 is provided beneath neck 34. A bottom 36 of the shoulder portion 35 defines an upper portion of a dosing chamber 45 which will be discussed in more detail below. A generally cylindrical body portion 37 extends from the shoulder 35. The body portion 37 and neck 34 are generally concentric with regard to axis A—A. Within the sides of body portion 37, four spaced openings 26 are provided. While four openings 26 have been shown, it should be understood that any number of openings can be used and any desired spacing for these openings can be had around the circumference of the body portion 37.

Between each of the openings 26, the circumferential ridges 24 are provided as discussed above. These ridges are also seen in FIGS. 1C and 3. The circumferential ridges 24 can aid in positioning of the dosing means 14 within the dispenser 4 and they hold the cylinder housing 22 stationary relative to the dispenser 4.

Figure 6:
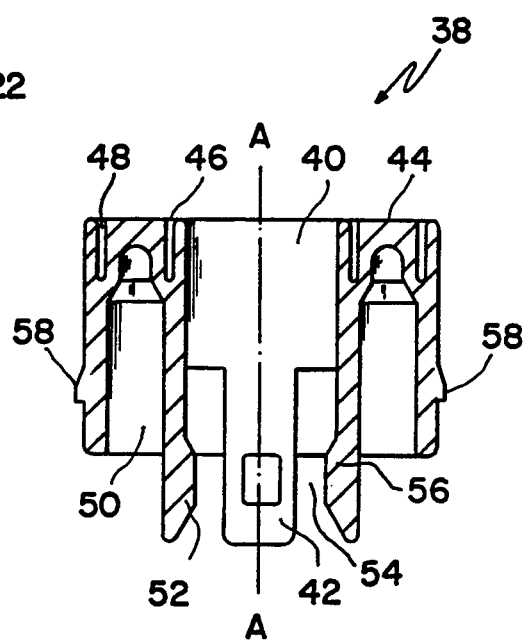
FIG. 6 is a cross-sectional view of the piston of the instant invention.
Figure 7:
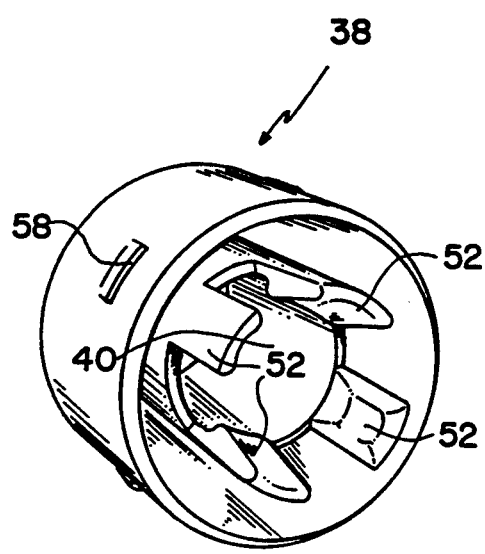
FIG. 7 is a perspective, bottom view of the piston of the instant invention.

Within cylinder housing 22, a slidable, piston 38 will be positioned. This piston 38 is best seen in FIGS. 6 and 7. Piston 38 has a top opening 40 and a bottom opening 42. A plurality of depending fingers 52 extend downwardly from piston 38. Spaces 54 are provided between each of these fingers and detents 56 are provided on each of these fingers. These detents 56 will normally engage a stem portion 70 of valve 60 and be moved between raised portion 71 and the top surface 74 of ridge 72 as will be discussed in detail below. It should be understood that while four fingers 52 are shown in FIGS. 6 and 7, any number of fingers Or any suitable configuration for a detent could be used. It should also be noted that the fingers 52 and detents 56 are cammed on the lower surface whereby the valve 60 may easily be inserted into the central opening of the piston 38.

Piston 38 has a drive face 44 which will coact with the bottom 36 of shoulder portion 35 of cylinder housing 22 as will be discussed in detail below. This drive face 44 and bottom 36 will form chamber 45. Along this drive face 44, an inner annular groove 46 and outer annular groove 48 are provided. While grooves are shown, it should be understood that this drive face 44 can be unbroken.

Within piston 38, an underside annular groove 50 is provided. Provision of this groove 50 reduces the amount of material needed to manufacture the piston 38 and makes this member lighter. On the outside wall of piston 38, a plurality of detents 58 are provided. Detents 58 match the positioning of openings 26 in cylinder housing 22. The piston 38 may be slid within the cylinder housing 22 and held therein by engagement of detents 58 with openings 26. The upper slope of the cam surface of detent 58 aids in insertion of the piston 38 into the cylinder housing 22. This piston 38 can be reciprocated relative to the cylinder housing 22 as will be discussed in more detail below.

Figure 8:
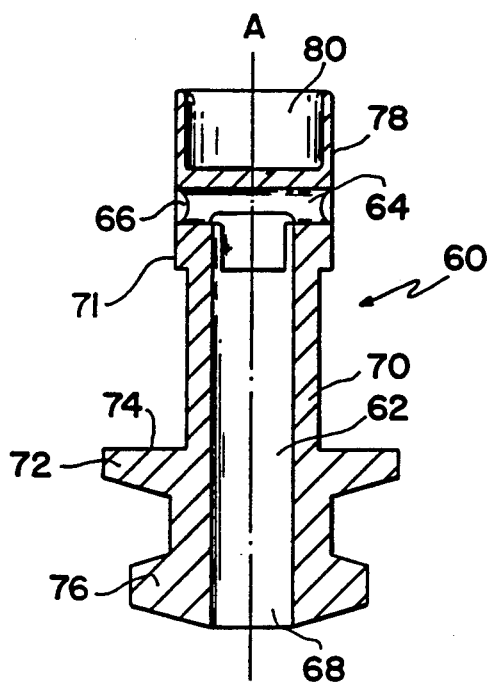
FIG. 8 is a cross-sectional view of the valve of the instant invention.

Now referring to FIG. 8, the valve 60 will be described. This valve 60 has a central passage 62 within stem 70. At the upper end of central passage 62, a transverse passage 64 is provided. Fluid can flow through transverse passage openings 66, transverse passage 64 and central passage 62 and then be dispensed from bottom opening 68.

The valve 60 includes a raised portion 71 at its upper end. Part of this raised portion is an annular wall 78 which will be positioned within the neck 34 of the cylinder housing 22 when the valve 60 is moved to certain positions as will be discussed below. The annular wall 78 has a recess 80 defined therein.

Around the lower stem 70 of valve 60, an upper ridge 72 and a lower ridge 76 are provided. While these ridges are varied in size, any suitable configuration can be used. The fork 8 will be engaged between the upper and lower ridges 72, 76 when the dosing system 2 is placed within dispenser 4. Such mounting is accomplished by merely longitudinally sliding the dosing means 14 into position within the dispenser as described above. The end of the fork 8 will engage valve 60 and upon movement by drive means 9, the valve 60 is moved through a variety of positions.

Figure 11:
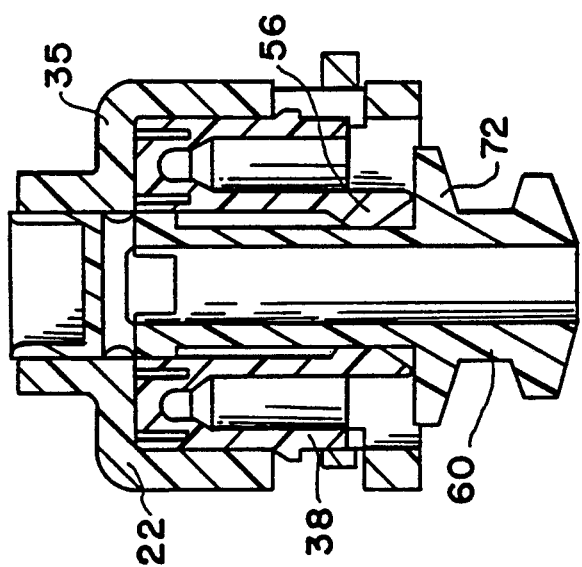
FIG. 11 is a cross-sectional view of the dosing means of the instant invention with the valve in the third position.
Figure 10:
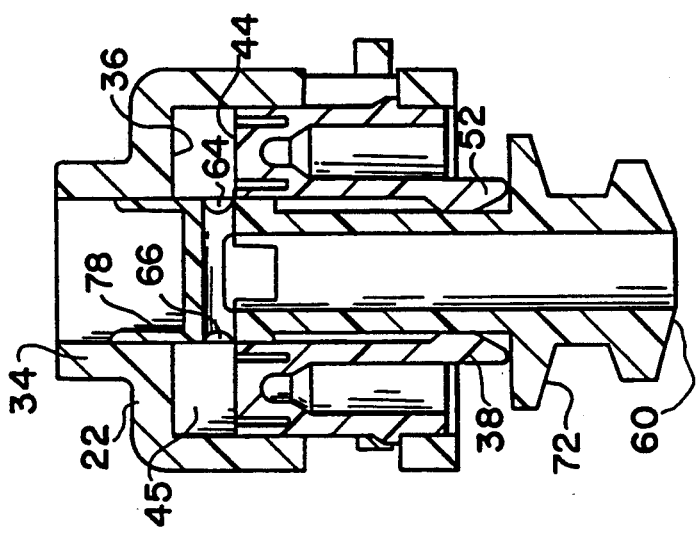
FIG. 10 is a cross-sectional view of the dosing means of the instant invention with the valve in the second position.
Figure 9:
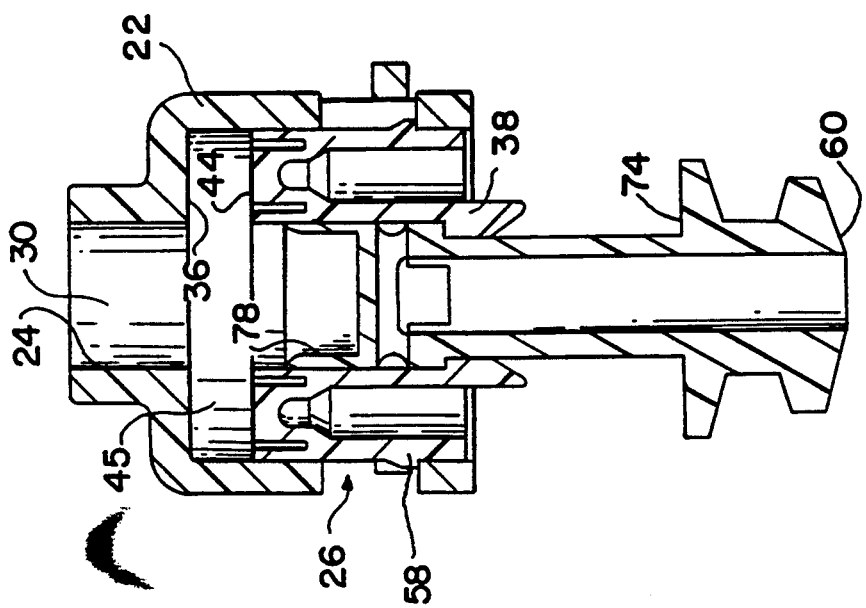
FIG. 9 is a cross-sectional view of the dosing means of the instant invention with the valve in the first position.

Referring now to FIGS. 9–11, three of these positions for the valve 60 will be discussed. Initially, as shown in FIG. 9, the valve is in the first position. The annular wall 78 of the valve 60 is removed from the neck portion 34 of cylinder housing 22. Fluid from vessel 11 is free to flow by gravity through the inlet 30 formed by neck 34. This fluid will collect in chamber 45. As set forth above, chamber 45 is formed by the bottom 36 of shoulder portion 35 and the drive face 44 of the piston 38.

Upon movement of drive means 9, the valve 60 is moved from the FIG. 9 to the FIG. 10 position. In the second position of FIG. 10, the annular wall 78 engages the neck 34 of cylinder housing 22 thereby sealing the chamber 45 from the liquid in the funnel portion 18 and vessel 11. Within chamber 45, a measured dose of fluid is held. As can be seen in FIG. 10, the upper ridge 72 of valve 60 engages the bottom of finger 52 of piston 38.

Upon further movement of drive means 9, the valve 60 will move from the second position shown in FIG. 10 to the third position shown in FIG. 11. The ridge 72 of valve 60 pushes the piston 38 toward shoulder portion 35 of cylinder housing 22. While FIG. 11 shows the drive face 44 of piston 38 engaging the bottom 36 of the shoulder portion 35, it should be understood that this Piston 38 can merely be moved proximate to the shoulder portion 35. As long as the piston 38 is constantly moved over the same distance, then a measured quantity of fluid can repeatedly be dispensed from the dosing system 2. If the drive face 44 is moved into engagement with bottom 36, this measured dosage can easily be achieved without the need for great precision of movement by drive means 9.

In order to dispense this measured quantity of fluid, the fluid first flows under the influence of gravity through neck 34 of cylinder housing 22 into chamber 45 when valve 60 is in the first position shown in FIG. 9. The valve 60 is then moved to the second position of FIG. 10 wherein fluid within chamber 45 is sealed from fluid in the funnel portion 18 and vessel 11. The transverse passage 64 is exposed to the fluid within chamber 45 when the valve 60 is in the second position. In this manner, fluid can be dispensed.

It should be noted that no venting arrangement is provided for discharging fluid from chamber 45. Accordingly, if the valve 60 were to only move to the second position of FIG. 10, fluid might remain in chamber 45 and not be dispensed therefrom. However, further movement of the valve 60 to the third position shown in FIG. 11 causes the piston 38 to pump fluid remaining in chamber 45 therefrom. In this manner, fluid is assuredly fed from the dosing system 2 in a measured quantity and the use of extra elements for venting is avoided. Moreover, if a sticky fluid is to be fed, there is no problem of adhesion of the fluid resulting in improper dispensing as might happen when using a vented system.

In avoiding a venting arrangement, the piston 38 acts as a pump. This piston 38 will move between the FIG. 10 and the FIG. 11 positions upon movement of valve 60. The detents 58 of piston 38 will slide along opening 26 of cylinder housing 22. When moving the piston 38 downward, these detents 58 will engage the bottom of the side opening 26. Due to the flat surface of detent 58, downward movement of piston 38 will stop and the piston 38 will assuredly be held within cylinder housing 22. While the upper surface of detent 58 has a sloped cam surface to aid in insertion of piston 38 within cylinder housing 22, this detent 58 will also engage the upper side of opening 26 when the piston 38 moves to the FIG. 11 position. This engagement is satisfactory to stop upward movement of piston 38. Additionally, if drive face 44 of piston 38 does engage the bottom 36 of shoulder portion 35, no further upward movement of the piston 38 may be had. Regardless, this upward movement for piston 38 causes a pumping action.

Apart from pumping the fluid, the dosing means 14 has a unique sealing feature. With reference to FIG. 9, the annular wall 78 of valve 60 engages the inside of piston 38. The openings 26 in cylinder housing 22 are not exposed to the atmosphere due to the piston 38. Thus, the only opening to the interior of the dosing means 14 is through inlet 30. Because neck portion 34 is attached to funnel portion 18 which is attached to bag 10, none of the liquid within vessel 11, funnel 18 or dosing means 14 is exposed to the ambient environment. When moved from the first position of FIG. 9 to the second position of FIG. 10, the annular wall 78 has a sufficient length to maintain the seal. In other words, the annular wall 78 will first engage the inside of piston 38, then simultaneously engage both the inside of piston 38 and the lower portion of neck 34 and then engage only the neck portion 34. When in the second position as shown in FIG. 10, the annular wall 78 will engage neck 34 to maintain a seal whereby fluid within funnel portion 18 and vessel 11 will not be exposed to the ambient environment.

By maintaining the fluid in a sealed condition within the dosing system 2, possible contamination of the fluid is avoided. Also, with sensitive fluids such as those containing vitamin C, air contact can be harmful. Such contact is avoided with the instant system. Moreover, the combination of the sealing feature and non-venting feature results in a no drip dosing system.

While the upward movement of valve 60 has been discussed above, the downward movement will now be discussed. After valve 60 reaches the position 3 shown in FIG. 11, the drive means 9 will move this valve 60 downwardly through the position 2 shown in FIG. 10 to position 1 shown in FIG. 9. Thus, the dosing system 2 can be readied for dispensing a subsequent quantity of measured fluid. The downward movement of valve 60 is stopped by engagement of raised portion 71 with detents 56 on fingers 52 of the piston 38 after the piston 38 has moved to the FIG. 9 position. In other words, valve 60 will move downwardly and the raised portion 71 will first engage detents 56. The drive means 9 for fork 8 will continue to move valve 60 downwardly whereby the piston 3B is then moved away from shoulder portion 35 of cylinder housing 22. This downward movement of piston 38 creates suction to assist in the gravity feed of fluid from vessel 11 to chamber 45. It should be recognized that when valve 60 is in this Position, the wall 78 of the valve 60 has been withdrawn from inlet 30 thereby allowing fluid flow from vessel 11 to chamber 45. Eventually, detents 58 of piston 38 will engage the bottom of openings 26. Because the raised portion 71 of valve 60 is in engagement with detents 52 of the piston 38, and because the detents 58 engage the bottom of openings 26, further downward movement of the valve 60 is prevented.

While the components of the dosing system have been extensively discussed above, the steps in the method for dispensing a measured dose of fluid will now be reiterated. First, vessel 11 is filled with a fluid to be dispensed. Dosing means 14 is provided on the lower side of the vessel and fluid is fed by gravity from vessel 11 to this dosing means 14. The amount of fluid to be dispensed or a portion thereof is then metered by moving the valve to the first position to permit fluid to enter chamber 45. Valve 60 is then moved to the second position to close the inlet of chamber 45 and seal fluid therein from the vessel 11. Discharge of the fluid from chamber 45 will be started by moving the valve towards the third position. The fluid passage in the valve will first be exposed to the fluid in chamber 45 during this step. Finally, the desired amount of fluid remaining in chamber 45 may be pumped therefrom by moving the piston 38 towards the shoulder portion 35 of cylinder housing 22. These steps can be repeated whereby measured quantities of fluid can repeatedly be dispensed to achieve the proper total dose.

The vessel 11, funnel portion 18 and dosing means 14 used in the dispensing method are a single, unitary structure. They can be manufactured at a factory whereby a user of the dosing system need perform no assembly. Thus, no screwing or unscrewing of the system is needed. Also no tools are required for using the dosing system. Rather, ring 28 merely needs to be pulled downward to remove the funnel portion 18 and dosing means 14 from within the vessel 11. The dosing system 2 can then be slid into dispenser 4 whereby fork 8 will be positioned between upper and lower ridges 72, 76 of valve 60. Accordingly, this dosing system 2 is easily loaded and requires no skill to operate.

Because the vessel 1, funnel portion 18 and dosing means 14 are sealed, no cleaning of the system is necessary. This is particularly useful when used in a home environment because the user may not be very fastidious in their cleaning care. There is no need to clean dosing means 14 or vessel 11 because they are simply discarded when vessel 11 is empty. Thus, minimal, if any maintenance of the dosing system is required and microbiological spoilage can be avoided.

When loaded into dispenser 4, the dosing system 2 can provide for in-cup mixing of a beverage. Because no syrup or beverage will come into contact with the dispenser hardware, the need for cleaning the dispenser is avoided. Thus, a sanitary arrangement is provided by the instant invention.

The dosing system 2 of the instant invention provides for an attractive appearance which can easily be used in a home environment or a commercial setting. When using a soft-pack container such as bag 10, there is very low fluid wastage. Overall, an effective and efficient dosing system and method are provided by the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An apparatus for dispensing metered quantities of liquid from an unvented container through a discharge opening thereof comprising:
   a pump housing having an inlet port in liquid communication with said discharge opening and an outlet port through which the liquid is dispensed, said inlet port being formed in a housing wall disposed across the discharge opening of the container;
   piston means disposed for reciprocating movement within said housing through a suction stroke and a compression stroke, said piston means having a drive face opposite to said inlet port and housing wall, said drive face and wall defining a pump chamber therebetween for receiving a metered quantity of liquid to be pumped from the container, said outlet port communicating with said pump chamber, the movement of the drive face of the piston drawing liquid from the container through the inlet port into the pump chamber during the suction stroke and discharging liquid for the pump chamber through the outlet port during the compression stroke; and
   valve means operatively connected to said inlet and outlet ports for opening said inlet port and closing said outlet port of the pump housing during said suction stroke, and closing the inlet port and opening the outlet port during said compression stroke; whereby no ambient air may pass through the pump chamber into said container.

2. The apparatus of claim 1 wherein said unvented container comprises a substantially rigid outer container and a flexible bag therein, said flexible bag containing said liquid, said discharge opening being formed through aligned openings in both said outer container and flexible bag.

3. The apparatus of claim 2 wherein the pump means and unvented container are connected by a flexible membrane movable between inboard and outboard positions of a wall of the unvented container in which said discharge opening is disposed such that said pump means is also movable to inboard and outboard positions with respect to the wall of the unvented container.

4. The apparatus of claim 3 further including a manually engageable pull-ring connected to the pump housing for pulling the pump means to the outboard position.

5. The apparatus of claim 1 wherein the pump means and unvented container are connected by a flexible membrane movable between inboard and outboard positions of a wall of the unvented container in which said discharge opening is disposed such that said pump means is also movable to inboard and outboard positions with respect to the wall of the unvented container.

6. The application of claim 5 further including a manually engageable pull-ring connected to the pump housing for pulling the pump means to the outboard position.

7. An article of manufacture for dispensing metered quantities of beverage concentrate from an unvented container through a discharge opening thereof comprising:
   a supply of beverage concentrate within said container;
   a pump housing having an inlet port in liquid communication with said discharge opening and an outlet port through which the beverage concentrate is dispensed, said inlet port being formed in a housing wall disposed across the discharge opening of the container;
   piston means disposed for reciprocating movement within said housing through a suction stroke and a compression stroke, said piston means having a drive face opposite to said inlet port and housing wall, said drive face and wall defining a pump chamber therebetween for receiving the metered quantity of concentrate to be pumped from the container, said outlet port communicating with said pump chamber, the movement of the drive face of the piston drawing concentrate from the container through the inlet port into the pump chamber during the suction stroke and discharging concentrate from the pump chamber through the outlet port during the compression stroke; and valve means operatively connected to said inlet and outlet ports for opening said inlet port and closing said outlet port of the pump housing during said suction stroke, and closing the inlet port and opening the outlet port during said compression stroke; whereby no ambient air may pass through the pump chamber into said container.

8. The article of manufacture of claim 7 wherein said unvented container comprises a substantially rigid outer container and a flexible bag therein, said flexible bag containing said concentrate, said discharge opening being formed through aligned openings in both said outer container and flexible bag.

9. The article of manufacture of claim 8 wherein the pump means and unvented container are connected by a flexible membrane movable between inboard and outboard positions of a wall of the unvented container in which said discharge opening is disposed such that said pump means is also movable to inboard and outboard positions with respect to the wall of the unvented container.

10. The article of manufacture of claim 9 further including a manually engageable pull-ring connected to the pump housing for pulling the pump means to the outboard position.

11. The article of manufacture of claim 7 wherein the pump means and unvented container are connected by a flexible membrane movable between inboard and outboard positions of a wall of the unvented container in which said discharge opening is disposed such that said pump means is also movable to inboard and outboard positions with respect to the wall of the unvented container.

12. The article of manufacture of claim 11 further including a manually engageable pull-ring connected to the pump housing for pulling the pump means to the outboard position.

* * * * *